United States Patent
Hicks et al.

(10) Patent No.: US 11,340,897 B1
(45) Date of Patent: May 24, 2022

(54) SUBJECT MATTER EXPERT IDENTIFICATION FOR COMPUTER SOFTWARE

(71) Applicant: International Business Machines Corporation, Armonk, NY (US)

(72) Inventors: Andrew C. M. Hicks, Wappingers Falls, NY (US); Robert Peter Catalano, Montgomery, NY (US); Tyler Vezio Rimaldi, Mahopac, NY (US); Michael E. Gildein, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/114,580

(22) Filed: Dec. 8, 2020

(51) Int. Cl.
| | |
|---|---|
| *G06F 8/71* | (2018.01) |
| *G06Q 10/10* | (2012.01) |
| *G06F 16/14* | (2019.01) |
| *G06Q 10/06* | (2012.01) |

(52) U.S. Cl.
CPC ............... *G06F 8/71* (2013.01); *G06F 16/14* (2019.01); *G06Q 10/105* (2013.01); *G06Q 10/06398* (2013.01); *G06Q 10/101* (2013.01)

(58) Field of Classification Search
CPC ... G06F 8/70; G06F 8/71; G06F 16/14; G06F 40/205; G06Q 10/105; G06Q 10/06398; G06Q 10/101
USPC .......................................................... 717/122
See application file for complete search history.

(56) References Cited

U.S. PATENT DOCUMENTS

| | | | |
|---|---|---|---|
| 6,487,713 B1* | 11/2002 | Cohen ....................... | G06F 8/34 |
| | | | 717/105 |
| 7,243,109 B2 | 7/2007 | Omega et al. | |
| 7,395,222 B1 | 7/2008 | Sotos | |
| 8,892,549 B1 | 11/2014 | Thakur | |
| 9,785,421 B1* | 10/2017 | Neatherway .............. | G06F 8/77 |
| 10,102,290 B2 | 10/2018 | Spaulding et al. | |
| 2007/0168345 A1 | 7/2007 | Gibbs et al. | |

(Continued)

FOREIGN PATENT DOCUMENTS

WO    2015013436 A2    1/2015

OTHER PUBLICATIONS

Yara Rules Strings Statistical Study, Apr. 6, 2017, 4 pages,[retrieved on Dec. 3, 2021], Retrieved from the Internet: <URL:https://yara-rules.github.io/blog/2017/04/06/yara-rules-strings-statistical-study/>.*

(Continued)

*Primary Examiner* — Geoffrey R St Leger
(74) *Attorney, Agent, or Firm* — Cantor Colburn LLP; Teddi Maranzano

(57) ABSTRACT

Techniques for subject matter expert identification for computer software are described herein. An aspect includes receiving a search string. Another aspect includes searching a plurality of library usage data files to determine a selected library corresponding to the search string. Another aspect includes determining a location of a library call corresponding to the selected library in source code. Another aspect includes determining a computer programmer associated with the determined location based on version control metadata corresponding to the source code. Another aspect includes identifying the determined computer programmer as a subject matter expert for the selected library.

17 Claims, 4 Drawing Sheets

(56) References Cited

U.S. PATENT DOCUMENTS

| | | |
|---|---|---|
| 2010/0262610 A1 | 10/2010 | Acosta et al. |
| 2019/0272171 A1* | 9/2019 | Chen .......................... G06F 8/77 |
| 2020/0202007 A1* | 6/2020 | Nagaraja ............. G06F 11/3688 |
| 2021/0089286 A1* | 3/2021 | Barkus .................... G06F 8/433 |

OTHER PUBLICATIONS

Sindhgatta, Renuka, Identifying Domain Expertise of Developers from Source Code, KDD '08: Proceedings of the 14th ACM SIGKDD international conference on Knowledge discovery and data mining, Aug. 2008, pp. 981-989, [retrieved on Mar. 26, 2022], Retrieved from the Internet: <URL:http://dl.acm.org/>.*

Oliveira, Johnatan, et al., JExpert: A Tool for Library Expert Identification, SBES '20: Proceedings of the 34th Brazilian Symposium on Software Engineering, Oct. 2020, pp. 386-392, [retrieved on Mar. 26, 2022], Retrieved from the Internet: <URL:http://dl.acm.org/>.*

Montandon, Joao Eduardo, et al., Identifying Experts in Software Libraries and Frameworks among GitHub Users, 2019 IEEE/ACM 16th International Conference on Mining Software Repositories (MSR), May 25-31, 2019, pp. 276-287, [retrieved on Mar. 26, 2022], Retrieved from the Internet: <URL:http://ieeexplore.ieee.org/>.*

* cited by examiner

SUBJECT MATTER EXPERT IDENTIFICATION FOR COMPUTER SOFTWARE

BACKGROUND

The present invention generally relates to computer systems, and more specifically, to subject matter expert identification for computer software.

In computer science, a library is a collection of resources for software development. Libraries can include sets of predefined modules, or functions, each having a defined interface that is used to invoke a particular behavior. Library code can be reused across any number of independent software programs. When a program invokes a library by calling a function or module of the library, the program gains the behavior implemented inside that library without having to explicitly implement that behavior itself. For example, a software developer can invoke a function of a library to make a system call instead of writing out the source code required for the system call. Libraries can encourage the sharing of code in a modular fashion, and can ease the distribution of code. Compiled programming languages can have standard libraries; for example, a programming language such as C can provide libraries that implement system services or mathematical functions. Computer programmers can also create custom libraries that implement functions that may be reused frequently.

The behavior implemented by a library can be connected to the invoking software program at various program lifecycle phases. If the code of the library is accessed during the build of the invoking program, then the library is called a static library. An alternative is to build the executable file of the invoking program and distribute the executable file independently of the library implementation. The library behavior can be connected to the invoking program after the executable file has been invoked to be run, either as part of the process of starting execution, or in the middle of execution of the invoking program, in this case the library is called a dynamic library. A dynamic library can be loaded and linked when preparing a program for execution by the linker. Alternatively, during execution, a software application may explicitly request that a library module be loaded.

SUMMARY

Embodiments of the present invention are directed to subject matter expert identification for computer software. A non-limiting example computer-implemented method includes receiving a search string. The method also includes searching a plurality of library usage data files to determine a selected library corresponding to the search string. The method also includes determining a location of a library call corresponding to the selected library in source code. The method also includes determining a computer programmer associated with the determined location based on version control metadata corresponding to the source code. The method also includes identifying the determined computer programmer as a subject matter expert for the selected library.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide subject matter expert identification for computer software. A subject matter expert for a particular software library can be determined by identifying a computer programmer that has written source code that references the particular software library. Subject matter experts can be ranked based on skill metrics generated from a computer programmer's coding and development history (e.g., an amount of code written and successfully deployed, and/or a number of code reviews the computer programmer has assisted in). For a library that is commonly used (e.g., a standard library for a programming language such as C), an organization (e.g., a company) may have access to multiple computer programmers that can be considered subject matter experts. For less commonly used libraries (e.g., a custom library), a subject matter expert can be more difficult to identify.

A relatively large number of libraries, each including any number of modules or functions, can be used across a number of public and private code repositories. Source code in a set of public and private repositories can be scanned to determine any libraries that are called in the source code, and a respective library usage data file can be generated for each code repository. The library usage data file for a code repository can include the names of library calls that are identified in the source code of the code repository, and a location of each library call (e.g., file name and code line). A library usage data file can be in any appropriate format, including but not limited to extensible markup language (XML). Based on receipt of a search string corresponding to a library, any library calls that match the search string in any of the library usage data files can be identified. The locations of the matching library calls can be cross referenced with version control metadata in order to identify the computer programmer that wrote the line or snippet of code for each matching library call, and a subject matter expert can be selected for the search string from the identified computer programmers.

For a search string that matches a library function or module name that is included in multiple libraries, a most unique library can be determined. For example, it can be determined that the matching library that is used in the lowest number of repositories is the most unique library based on term frequency-inverse document frequency (TFIDF). A library that is used across a higher number of repositories is more likely to be searchable through non-proprietary means than a library that is referenced in a relatively small number of repositories. A computer programmer that has written code corresponding to the most unique library can be identified as a subject matter expert for that search string.

Figure 1:
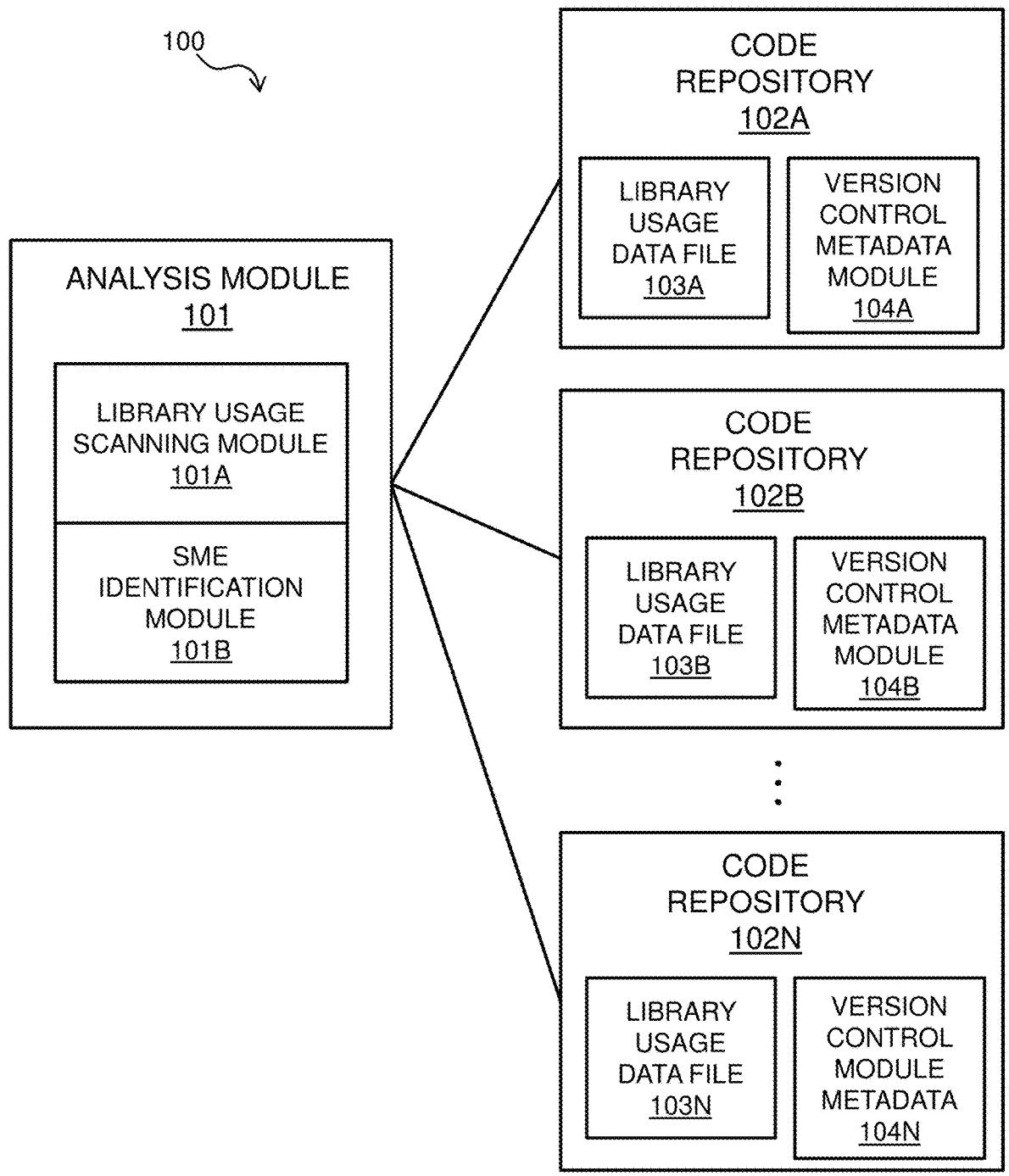
FIG. 1 is a block diagram of components of a system for subject matter expert identification for computer software in accordance with one or more embodiments of the present invention.

Turning now to FIG. 1, a system 100 for subject matter expert identification for computer software is generally shown in accordance with one or more embodiments of the present invention. Embodiments of system 100 of FIG. 1 can be implemented in conjunction with any appropriate computer system, including but not limited to computer system 400 of FIG. 4. System 100 includes an analysis module 101 including a library usage scanning module 101A and a subject matter expert (SME) identification module 101B that are each in communication with a plurality of code repositories 102A-N. Each code repository 102A-N of system 100 includes a code base of source code that can be written in any appropriate computer programming language(s), and can include any appropriate number of files. Code repositories 102A-N can include any number of private and public code repositories in various embodiments of the invention. The source code in code repositories 102A-N can use any number of libraries, and the libraries can be any appropriate types of libraries, including but not limited to standard libraries, custom libraries, dynamic libraries, and static libraries in various embodiments. Library usage scanning module 101A generates a respective library usage data file 103A-N for each of code repositories 102A-N; each library usage data file 103A-N includes data (e.g., location data) regarding each library call in the source code of the corresponding code repository of code repositories 102A-N. For example, library usage data file 103A includes a list of library calls and their respective locations in the source code of code repository 102A. The library usage data files 103A-N can be in any appropriate format (e.g., XML). In some embodiments of system 100, the library usage scanning module 101A can store the library usage data files 103A-N separately from the code repositories 102A-N (e.g., in a library usage data file database that is in communication with SME identification module 101B). Such a library usage data file database can hide the actual contents of any private code repositories of code repositories 102A-N from the SME identification module 101B and from the user. Generation of the library usage data files 103A-N by library usage scanning module 101A is discussed in further detail below with respect to method 200 of FIG. 2.

Each code repository 102A-N in system 100 of FIG. 1 includes an associated version control metadata module 104A-N. The version control metadata modules 104A-N include data regarding the identity of the computer programmer(s) that wrote each unit (e.g., line or snippet) of source code in the respective code repository 102A-N. SME identification module 101B can, based on a received search string, identify any code repositories that include source code that references a library corresponding to a received search string based on library usage data files 103A-N. SME identification module 101B can also identify particular computer programmers that are subject matter experts regarding a library corresponding to a received search string based on the determined matching library calls and version control metadata modules 104A-N. Operation of SME identification module 101B is discussed in further detail below with respect to method 300 of FIG. 3.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, code repositories, files, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
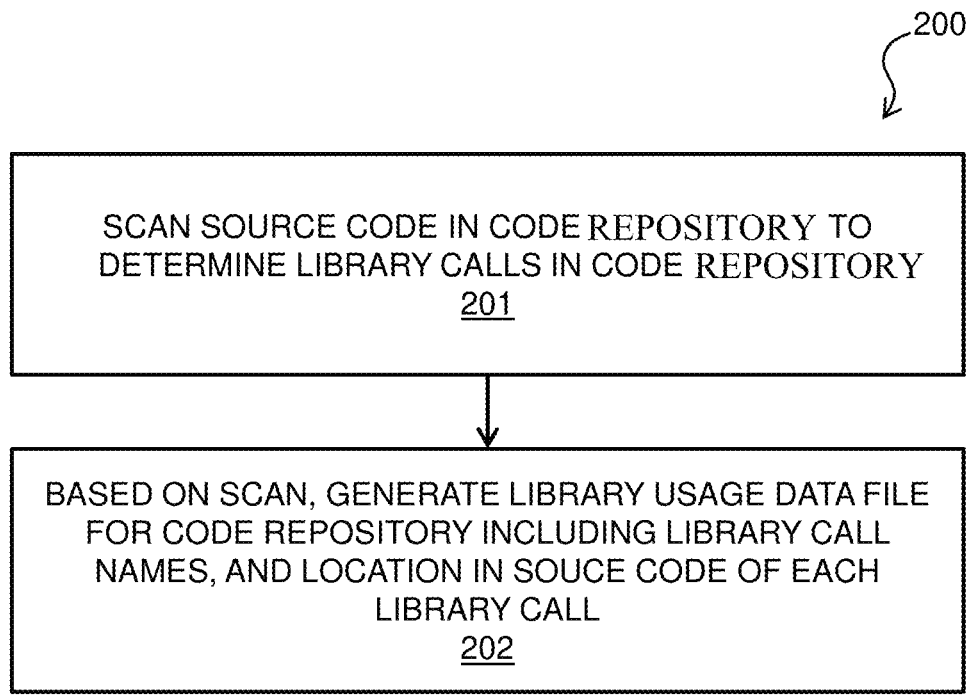
FIG. 2 is a flow diagram of a process for code repository scanning for subject matter expert identification for computer software in accordance with one or more embodiments of the present invention.

FIG. 2 shows a process flow diagram of a method 200 for code repository scanning for subject matter expert identification for computer software in accordance with one or more embodiments of the present invention. Method 200 of FIG. 2 can be implemented in embodiments of library usage scanning module 101A of system 100 of FIG. 1, and can be implemented in conjunction with any appropriate computer system, such as computer system 400 of FIG. 4. In block 201 of method 200, the source code in each code repository of code repositories 102A-N of system 100 of FIG. 1 is scanned by library usage scanning module 101A to determine any library calls that are included in the source code. The scanning may be performed in any appropriate manner. In some embodiments of block 201 of method 200, a lexical analysis of the source code in a code repository is performed via parsing of the source code. The source code in a file in a code repository of code repositories 102A-N may be tokenized to break up the source code into tokens comprising quantifiable and identifiable data. A list of tokens can be created for each line or statement in the file, and the list of tokens can be compared with other files within the same code repository, as well as files in different code repositories. Commonalities in the order of tokens among the lists of tokens across various files can allow the files to be grouped by language, and library calls can be identified in the code based on the tokenization in some embodiments of block 201.

In block 202, a respective library usage data file 103A-N is generated by library usage scanning module 101A for each code repository 102A-N based on the scanning that was performed in block 201. In some embodiments of the present invention, the respective library usage data files 103A-N can be stored within the code repositories 102A-N; in other embodiments of the present invention, the library usage data files 103A-N can be stored together in a separate database in system 100 that is in communication with SME identification module 101B. Each library usage data file of library usage data files 103A-N can include a list of the library calls that were identified by the scanning in block 201 in the code repository that is associated with the library usage data file, and, for each library call, a location (e.g., a file and line of code) of the library call. The library usage data files 103A-N can be in any appropriate format, including but not limited to XML.

Method 200 of FIG. 2 can be repeated for any code that is added to any of code repositories 102A-N throughout operation of system 100 of FIG. 1, and the library usage data files 103A-N can be updated based on the new or updated code. In some embodiments of the present invention, method 200 may only be applied to files that include new or updated code, such that code that has already been scanned is not scanned again.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
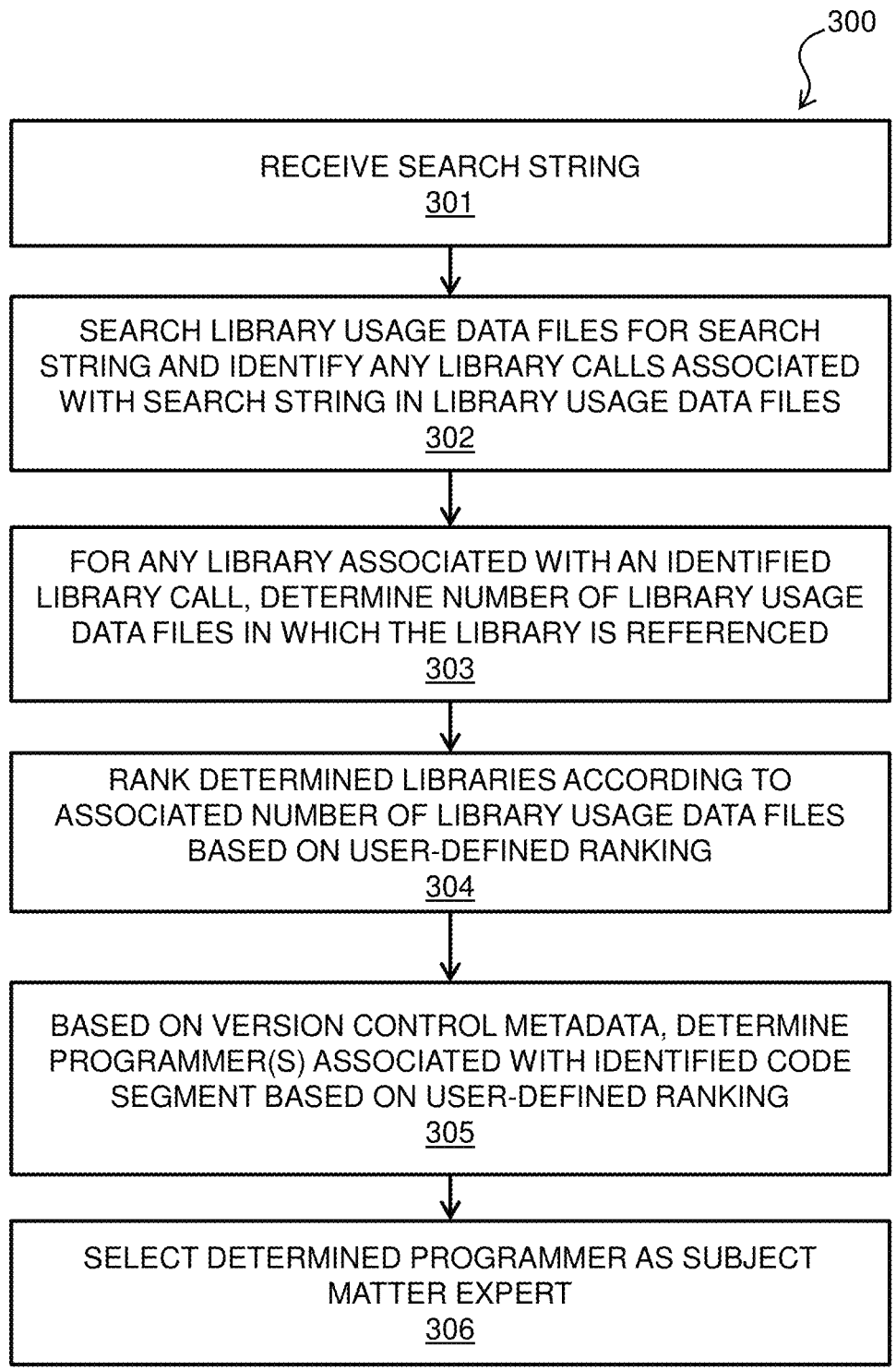
FIG. 3 is a flow diagram of a process for subject matter expert identification for computer software in accordance with one or more embodiments of the present invention.

FIG. 3 shows a process flow diagram of a method 300 for subject matter expert identification for computer software in accordance with one or more embodiments of the present invention. Method 300 of FIG. 3 can be implemented in embodiments of SME identification module 101B of system 100 of FIG. 1, and can be implemented in conjunction with any appropriate computer system, such as computer system 400 of FIG. 4. In block 301 of method 300, a search string is received by SME identification module 101B. In various embodiments, the search string can correspond to a library name or library function/module name. The search string of block 301 can be received from a user. In block 302, the SME identification module 101B searches the library usage data files 103A-N to determine any library calls that match the search string. In block 303, for any library corresponding to a matching library call that was determined in block 302, a number of library usage data files of library usage data files 103A-N in which the library is referenced is determined. In block 304, the determined libraries are ranked according to their determined number of library usage data files based on a user-defined ranking. Any appropriate ranking can be applied to the determined libraries in embodiments of block 304. In some embodiments of the invention, the determined libraries can be ranked from lowest determined number of library usage data files to highest (e.g., the top ranked library is associated with the lowest number of library usage data files). In block 305, based on version control metadata modules 104A-N, the identities of the programmer(s) associated with any code segments that are identified as including library calls to the top ranked library that was determined in block 304 are determined based on version control metadata modules 104A-N. The code segments can be identified based on the location data in the library usage data files. In some embodiments of the present invention, the identified programmers can be ranked in block 305 as potential subject matter experts based on skill metrics generated from the computer programmers' respective coding and development histories (e.g., an amount of code written and successfully deployed, and/or a number of code reviews the computer programmer has assisted in). In block 306, a top-ranked programmer identified in block 305 is selected as a subject matter expert.

In an example embodiment of method 300 of FIG. 3, a given search string that is received in block 301 can be determined to match calls to two different libraries, i.e., library SparkyMath and library TensorMath, in block 302 of method 300. For example, the search string can correspond to a function name, and library SparkyMath and library TensorMath can each include a function having the same name. However, the functions in different libraries may implement different behaviors. It can be further determined in block 303 that library SparkyMath appears in two different library usage data files of library usage data files 103A-N, meaning that SparkyMath is referenced in two code repositories out of all of the code repositories 102A-N that were included in the search. Library TensorMath can be determined in block 303 to appear in 50 different library usage data files of library usage data files 103A-N, meaning that SparkyMath is referenced in 50 code repositories out of all of the code repositories 102A-N that were included in the search. SparkyMath is therefore ranked ahead of TensorMath in block 304 of method 300, as SparkyMath is determined to be more unique than TensorMath. In block 305, any programmers who wrote code that includes any library calls to SparkyMath are determined based on version control metadata modules 104A-N, and, in block 306, a subject matter expert corresponding to the search string that was received in block 301 is selected from the determined programmers from block 305.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
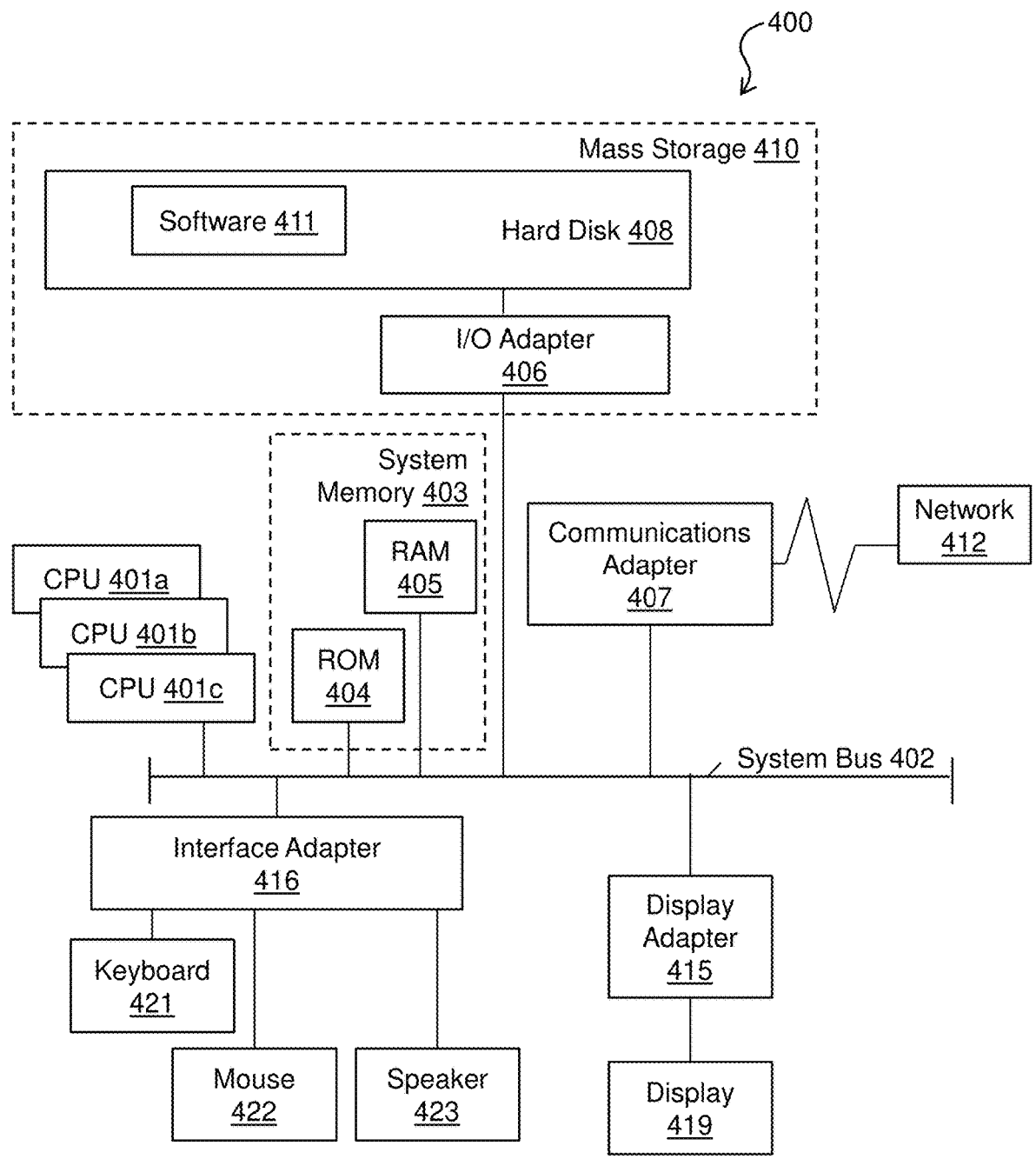
FIG. 4 is a block diagram of an example computer system for use in conjunction with one or more embodiments of subject matter expert identification for computer software.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a search string;
   searching a plurality of library usage data files to determine a plurality of libraries corresponding to the search string;
   determining, for each library of the plurality of libraries, a number of library usage data files in which the library is referenced; and
   selecting a library of the plurality of libraries that is referenced in a lowest number of library usage data files as a selected library;
   determining a location of a library call corresponding to the selected library in source code;
   determining a computer programmer associated with the determined location based on version control metadata corresponding to the source code; and
   identifying the determined computer programmer as a subject matter expert for the selected library.

2. The method of claim 1, wherein each library usage data file of the plurality of library usage data files corresponds to a respective code repository, each code repository comprising respective source code, and wherein a library usage data file of the plurality of library usage data files comprises a list of library calls and an associated location for each of the library calls in the source code of the code repository corresponding to the library usage data file.

3. The method of claim 1, further comprising:
   determining a plurality of code repositories, each code repository comprising respective source code; and
   scanning the source code in each code repository of the plurality of code repositories to determine any library calls located in the source code, wherein a respective library usage data file is generated for each code repository based on the scanning.

4. The method of claim 3, further comprising updating the library usage data file of a code repository based on updated code being introduced into the code repository.

5. The method of claim 3, wherein the plurality of code repositories comprises a plurality of public code repositories and a plurality of private code repositories.

6. The method of claim 3, further comprising storing the generated library usage data files in a library usage data file database that is separate from the plurality of code repositories.

7. A system comprising:
   a memory having computer readable instructions; and
   one or more processors for executing the computer readable instructions, the computer readable instructions controlling the one or more processors to perform operations comprising:
   receiving a search string;
   searching a plurality of library usage data files to determine a selected library corresponding to the search string;
   in response to the searching locating a single library corresponding to the search string, selecting the single library as the selected library;
   in response to the searching locating a plurality of libraries corresponding to the search string:
      determining, for each library of the plurality of libraries, a number of library usage data files in which the library is referenced; and
      selecting a library of the plurality of libraries that is referenced in a lowest number of library usage data files as the selected library;
   determining a location of a library call corresponding to the selected library in source code;
   determining a computer programmer associated with the determined location based on version control metadata corresponding to the source code; and
   identifying the determined computer programmer as a subject matter expert for the selected library.

8. The system of claim 7, wherein each library usage data file of the plurality of library usage data files corresponds to a respective code repository, each code repository comprising respective source code, and wherein a library usage data file of the plurality of library usage data files comprises a list of library calls and an associated location for each of the library calls in the source code of the code repository corresponding to the library usage data file.

9. The system of claim 7, further comprising:
   determining a plurality of code repositories, each code repository comprising respective source code; and scanning the source code in each code repository of the plurality of code repositories to determine any library calls located in the source code, wherein a respective library usage data file is generated for each code repository based on the scanning.

10. The system of claim 9, further comprising updating the library usage data file of a code repository based on updated code being introduced into the code repository.

11. The system of claim 9, wherein the plurality of code repositories comprises a plurality of public code repositories and a plurality of private code repositories.

12. The system of claim 9, further comprising storing the generated library usage data files in a library usage data file database that is separate from the plurality of code repositories.

13. A computer program product comprising a computer readable storage medium having program instructions embodied therewith, the program instructions executable by one or more processors to cause the one or more processors to perform operations comprising:

receiving a search string;

searching a plurality of library usage data files to determine a selected library corresponding to the search string;

in response to the searching locating a single library corresponding to the search string, selecting the single library as the selected library;

in response to the searching locating a plurality of libraries corresponding to the search string:

determining, for each library of the plurality of libraries, a number of library usage data files in which the library is referenced; and selecting a library of the plurality of libraries that is referenced in a lowest number of library usage data files as the selected library;

determining a location of a library call corresponding to the selected library in source code;

determining a computer programmer associated with the determined location based on version control metadata corresponding to the source code; and identifying the determined computer programmer as a subject matter expert for the selected library.

14. The computer program product of claim 13, wherein each library usage data file of the plurality of library usage data files corresponds to a respective code repository, each code repository comprising respective source code, and wherein a library usage data file of the plurality of library usage data files comprises a list of library calls and an associated location for each of the library calls in the source code of the code repository corresponding to the library usage data file.

15. The computer program product of claim 13, wherein the operations further comprise:

determining a plurality of code repositories, each code repository comprising respective source code; and scanning the source code in each code repository of the plurality of code repositories to determine any library calls located in the source code, wherein a respective library usage data file is generated for each code repository based on the scanning.

16. The computer program product of claim 15, wherein the operations further comprise updating the library usage data file of a code repository based on updated code being introduced into the code repository.

17. The computer program product of claim 15, wherein the plurality of code repositories comprises a plurality of public code repositories and a plurality of private code repositories.

* * * * *